United States Patent [19]

Fraden

[11] Patent Number: 4,896,039

[45] Date of Patent: Jan. 23, 1990

[54] ACTIVE INFRARED MOTION DETECTOR AND METHOD FOR DETECTING MOVEMENT

[76] Inventor: Jacob Fraden, 72 Hampton Rd., Hamden, Conn. 06518

[21] Appl. No.: 140,090

[22] Filed: Dec. 31, 1987

[51] Int. Cl.$^4$ .............................................. G01J 5/24
[52] U.S. Cl. ................................. 250/342; 250/338.3; 340/567
[58] Field of Search ............................ 250/342, 338.3; 340/567, 565, 541

[56] References Cited

U.S. PATENT DOCUMENTS

| | | | |
|---|---|---|---|
| Re. 29,082 | 12/1976 | Schwarz | 250/342 |
| 3,760,399 | 9/1973 | Schwarz | 340/567 |
| 3,809,920 | 5/1974 | Cohen et al. | 250/338.3 |
| 3,839,640 | 10/1974 | Rossin | 250/342 |
| 3,842,276 | 10/1974 | Southgate | 250/338.3 |
| 3,958,118 | 5/1976 | Schwarz | 340/567 |
| 4,052,616 | 10/1977 | Keller | 250/342 |
| 4,052,716 | 10/1977 | Mortensen | 340/567 |
| 4,225,786 | 9/1980 | Perlman | 250/338.1 |
| 4,321,594 | 3/1982 | Galvin et al. | 250/342 |
| 4,379,971 | 4/1983 | Smith et al. | 250/342 |
| 4,450,351 | 5/1984 | Fraden | 250/221 |
| 4,769,545 | 9/1988 | Fraden | 250/353 |

Primary Examiner—Janice A. Howell
Assistant Examiner—Richard Hanig
Attorney, Agent, or Firm—Robert A. Seemann

[57] ABSTRACT

A miniature active infrared motion detector contains a self-heating temperature sensitive resistor, an electronic circuit to maintain temperature of that resistor at predetermined constant level which is higher than ambient temperature. The detector actively radiates thermal energy to environment and measures electric power required to generate that energy. This provides information about temperature variations in surrounding objects. The detector is also comprised of a focusing system, image distortion means and a threshold circuit. An optical system can be made of a curved Fresnel lens or curved mirror, such as parabolic, cylindrical, spherical, etc. which distributes thermal radiation over narrow or wide field of view, potentially up to 360°. The method of detecting movements is based on the use of a warm sensor whose temperature is maintained constant and above ambient.

21 Claims, 4 Drawing Sheets

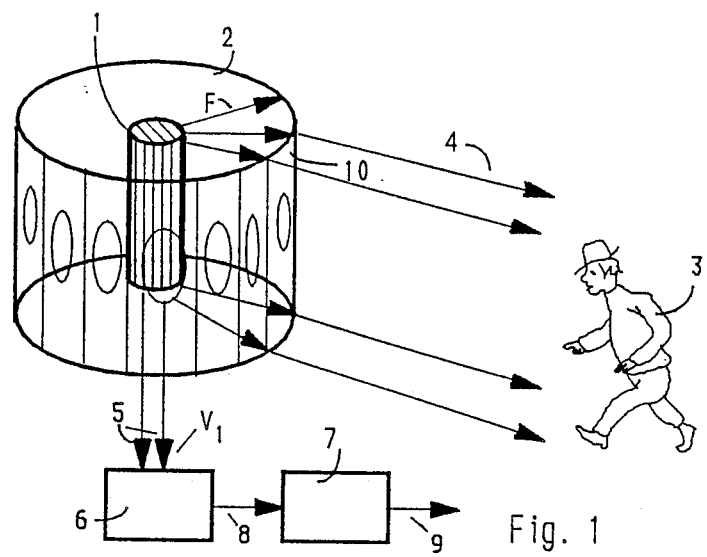
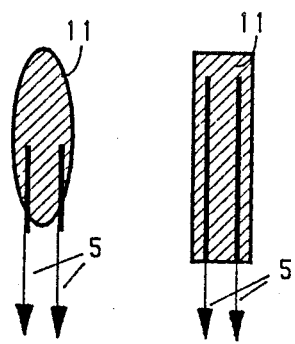 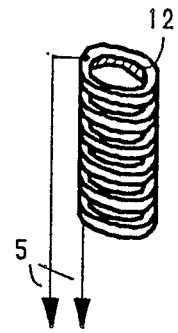 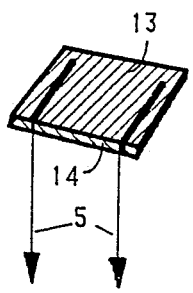
Fig. 2    Fig. 3    Fig. 4    Fig. 5
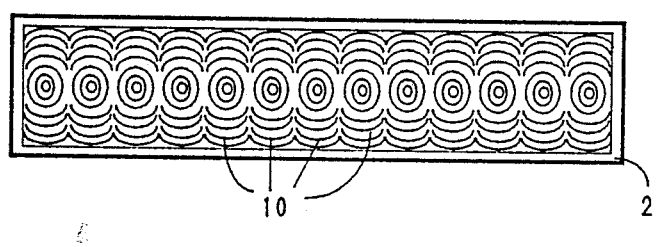
Fig. 6

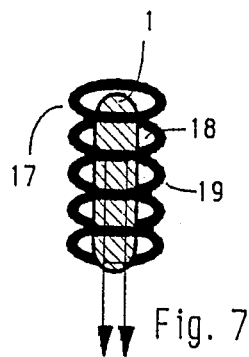
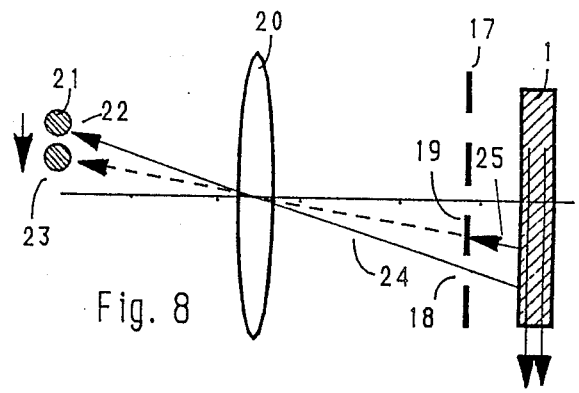
Fig. 7    Fig. 8
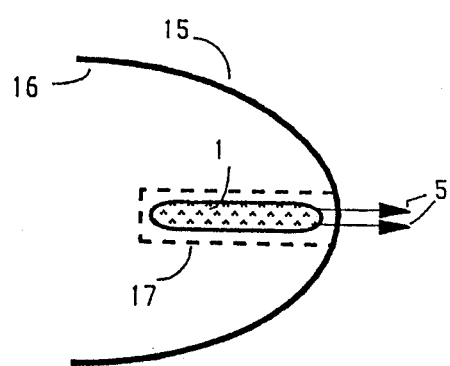
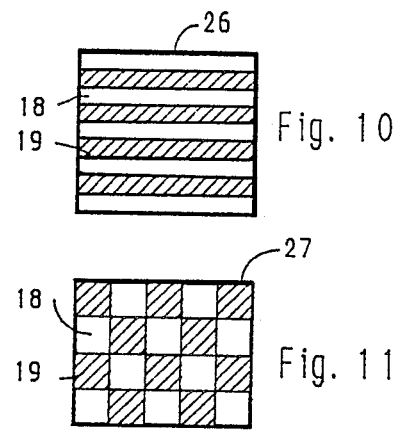
Fig. 9    Fig. 10    Fig. 11
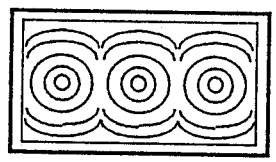
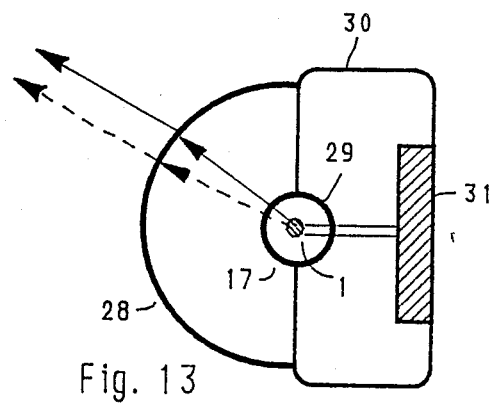
Fig. 12    Fig. 13

ACTIVE INFRARED MOTION DETECTOR AND METHOD FOR DETECTING MOVEMENT

BACKGROUND OF THE INVENTION

This invention relates to improvements in motion detectors used in intruder monitors, lighting control systems, robotics and other areas where presence of a moving person within boundaries of a space under surveillance is desirable. The proposed detector operates on the monitoring of abnormal rate of change in ambient temperature of such space, as would be occasioned by the movement therethrough of any object whose body heat differs from the steady state ambient temperature.

Any object emits radiation whose spectral characteristics depend on the object's temperature. If the temperature of the object is different than that of ambient, thermal energy transfer occurs between the object and the surrounding space. Humans, as objects whose movements should be detected, emit electromagnetic radiation in the wavelength range of 9 $\mu$m. On the other hand, any infrared motion detector contains a sensor, whose radiated wavelength also depends on its temperature. According to Stefan-Boltzmann law, net power, Nr, transferred by radiation is governed by the following equation:

$$Nr = \epsilon_o \cdot \epsilon_s \cdot \sigma \cdot A \cdot (T_s^4 - \beta \cdot T_o^4 - \alpha \cdot T_a^4), \quad (1)$$

where $\epsilon_o$ and $\epsilon_s$ are emissivities of the object and the sensor respectively (in most cases they are constant and close to unity), $\sigma$ is Stefan-Boltzmann constant, A is sensor's area, Ta, To and Ts are absolute temperatures of the surroundings, the object and the sensor respectively, $\alpha$ and $\beta$ are coupling coefficients between the sensor and surroundings and between the sensor and the object respectively, so that $\alpha + \beta = 1$. The above equation is the scientific basis for all passive infrared (PIR) motion detectors, known in the prior art.

A PIR detector passively detects thermal radiation absorbed by the sensor. As a result, speed of response of the passive sensor greatly depends on its volume, specific heat and mounting of the sensing material.

Several types of PIR detectors are known in the prior art. Mortensen (U.S. Pat. No. 4,052,716) discloses a system with plurality of thermistors which collect radiation by means of a parabolic focusing mirror. It uses a capacitive coupling to distinguish between slow and fast moving objects. A similar detector utilizing a thermopile sensor is disclosed by Schwartz (U.S. Pat. No. 3,760,399 and Re. 29,082). In this invention, two fixed thresholds and OR gate are used to detect positive and negative going signals from the preamplifier. The location and direction of the moving object in the prior art is determined by inventions of the above cited authors and by Keller (U.S. Pat. No. 4,052,616) and Schwartz (U.S. Pat. No. 3,958,118).

Many commercially available PIR detectors use pyroelectric crystals as thermal radiation sensors. Triglycine sulfate (TGS), lithium tantalate (LiTaO3) and ceramic pyroelectrics are the most popular materials for the manufacturing of PIR detectors.

Instead of a small size solid-state sensor, a pyroelectric detector can be designed with a polymer film, such as polyvinylidene fluoride (PVDF). Cohen (U.S. Pat. No. 3,809,920) discloses a design which contains the polymer film with conductive electrodes on both surfaces. The heat flow from non-moving objects can be separated by the cancelling technique, as it was disclosed in the U.S. Pat. No. 3,839,640 or by the use of a differential amplifier with common mode rejection of noise (Smith et al. U.S. Pat. No. 4,379,971). Smith's detector utilizes a polymer film with the interdigitized (alternating) electrodes on one side and a parabolic mirror as a focusing system. The patent of Southgate (U.S. Pat. No. 3,842,276) discloses the use of an alternative electrode arrangement on the opposite surfaces of the pyroelectric film to produce ambient temperature compensation. U.S. Pat. No. 4,225,786 issued to Perlman discloses design of a passive infrared detection system with a pyroelectric detector array.

All detectors from the above inventions use either thermistors, thermocouples or pyroelectrics as discrete sensors whose temperature passively follows that of ambient. A moving object radiates thermal energy toward the sensor whose temperature deviates from that of ambient in accordance with the movement of an object. To assure an an acceptable speed response, all passive sensors, known in the prior art, must be small. This imposes substantial demands on the focusing system, especially if wide field of view is required, and increases cost of the detector.

The focusing systems in the prior art are made of lenses and reflectors to concentrate radiation on the individual sensors. Some detectors use sectional Fresnel lenses (facets) which focus radiation on a single pyroelectric or thermopile sensor (RCA Motion Switch C-23, patent pending; Visonic Ltd. Motion Sensor SR-2000E; Kesser Electronics International, Inc. Infrared Sensor, Model 2006 and others presently commercially available). Wide field of view was achieved by the use of cylindrical shape of both the sensor and the lens, as in FIRM-287 motion detector, manufactured by the American IRIS Corporation. In the later detector, the sensor and the lens are curved with the radius equal to one half of focal length of the lens. U.S. Pat. No. 4,321,594 issued to Galvin teaches application of curved and multiple facet lenses to passive infrared detectors. U.S. Pat. No. 4,450,351 issued to J. Fraden teaches application of image distortion means to passive detectors operating in visible range of spectrum and the use of passive photoresistor having snake-like shape.

SUMMARY OF THE INVENTION

An object of the present invention is to provide a method of improved infrared motion detection.

Another object of the invention is to provide an infrared motion detection system in which the field of view is variable from narrow to very wide, potentially to spherical.

Another object of the invention is to provide an infrared motion detection system which is less sensitive to vibration, acoustic and other interferences of mechanical origin.

Another object of the invention is to provide an infrared motion detection system which is reliable, simple and inexpensive to produce.

Still another object of the present invention is to provide method of active infrared motion detection.

In the preferred embodiment, the active motion detector comprises a temperature sensitive resistor whose resistance (and subsequently, temperature) is forced by a control circuit to be constant during operation. The constant temperature of the resistor is selected to be higher than ambient temperature and, in some applications, higher than temperature of an object. For instance, since normal body temperature of humans and warm blooded animals is in the range of 37° C. (surface temperature is usually lower), constant temperature of the sensor can be selected in the vicinity of 40° C., which is usually higher than ambient. In another embodiment, it may be actively controlled by ambient temperature.

As it follows from Equation (1), contrary to the PIR sensors known in the prior art, the warm sensor actively radiates energy to surroundings and, specifically, toward the object, whose motions should be detected. Such detector can be dubbed as Active Infrared (ACIR) detector. Magnitude of the radiated power depends on both temperatures of the object and the sensor. On the other hand, the sensor is supplied with electric energy to compensate for radiation loss and to maintain its temperature and resistance on the constant levels. Since the sensor is of a resistive nature, electric current passing though it, causes heating. Such self-heating effect is described by the Equation:

$$N_e = V^2/R_s, \qquad (2)$$

where $N_e$ is electric power provided by the control circuit, V is voltage across the sensor, $R_s$ is resistance of the sensor. The law of conservation of total energy demands that $N_e = N_r$, and from the Equations (1) and (2) it follows that $$V^2/R_s = \epsilon_o \cdot \epsilon_s \cdot \sigma \cdot A \cdot (T_s^4 - \beta \cdot T^4 - \alpha \cdot T_a^4). \qquad (3)$$

In the right side of the above Equation, there is only one variable-coupling coefficient with the object, $\beta$. Voltage across the resistive sensor can be defined as $$V = \sqrt{R_s \cdot \epsilon_0 \cdot \epsilon_s \cdot \sigma \cdot A \cdot (T_s^4 - \beta \cdot T_0^4 - \alpha \cdot T_a^4)} = k\sqrt{(c - \beta \cdot T_0^4)}. \qquad (4)$$

where k and c are constants. The voltage, V, can be used for further signal processing, such as comparison with thresholds, similar to that known in the prior art. Since compensating electric power is provided by an external control circuit with sufficient dynamic range, equilibrium conditions required for the Equation (4) are achieved relatively fast, within few hundred milliseconds, as was shown experimentally.

To increase operating distance and improve signal-to-noise ratio, the sensor shall be provided with a focusing system, whose function is to distribute radiation from the sensor's surface to surroundings. The infrared radiation can be distributed either by lenses or mirrors. The Fresnel lens, made of a flexible far infrared transparent material (polyethylene, e.g.), is the common choice in the motion detector design. The other focusing means is the parabolic reflector. In both cases, the sensor must be positioned in the focal plane of the optical means.

To increase the field of view, the Fresnel lens can be curved to the desired angle. Since the resistive sensor may be shaped to any form, the lens can be curved around its circumference. This allows use of a single sensor and a single curved lens to fabricate a detector with a very wide angle of view—up to 360°. In the alternative design, the lens can be formed in a spherical shape to distribute radiation over a solid angle of any desirable value. The transmissive (lenses) as well as reflective focusing means can be used when narrow angles of view are required.

To increase spatial resolution of the detector, the ACIR sensor can be supplied with so called image distortion means, whose purpose is to break radiated thermal infrared beam into sectors. During object movements, the sectors result in modulated voltage at the sensor, because of changing $\beta$. Such image distortion means can be fabricated as a grid or mask having alternatively spaced openings and opaque portions.

The detector must contain an electronic circuit to control temperature of the resistive sensor, to filter out constant or slow changing components of the signal and to detect variations in the signal which exceed a certain predetermined threshold level.

The proposed active infrared method of motion detection, has the advantage of fast speed response of a relatively large sensor. This advantage permits simpler optical system design, especially for wide fields of view. A another advantage of the proposed sensor is its insensitivity to mechanical and acoustic noise, which presents substantial problems in the PIR sensors. Low production cost is another advantage of the proposed detector.

BRIEF DESCRIPTION OF THE DRAWINGS

FIG. 1 is a diagrammatical view of a preferred embodiment of a motion detector according to the present invention.

FIG. 2 is a schematic view of a droplet shaped resistive sensor.

FIG. 3 is a schematic view of a cylindrically shaped resistive sensor.

FIG. 4 is a schematic view of a spiral shaped resistive sensor.

FIG. 5 is a schematic view of a flat shaped resistive sensor.

FIG. 6 is a schematic view of a faceted infrared Fresnel lens.

FIG. 7 is a schematic view of a sensor with circumferencing grid.

FIG. 8 is a schematic view of an image distortion optical arrangement, with sensor.

FIG. 9 is a schematic view of a sensor with parabolic focusing mirror.

FIG. 10 is a schematic view of an image distortion optical grid.

FIG. 11 is a schematic view of an image distortion checkerboard pattern optical grid.

FIG. 12 is a schematic view of a sectional infrared Fresnel lens.

FIG. 13 is a schematic view of a motion detector with lens and mirror.

DESCRIPTION OF THE PREFERRED EMBODIMENTS

Figure 14:
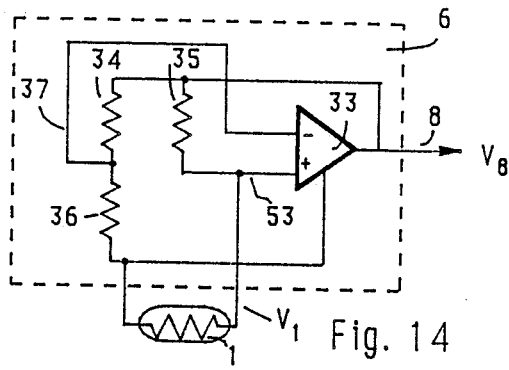
FIG. 14 is a schematic diagram of an electronic control circuit for regulation of the sensor's temperature.

FIG. 1 shows a general arrangement of the preferred embodiment of the motion detector having generally cylindrical shape. The focusing lens, 2, surrounds temperature sensitive resistor, 1. The sensor is positioned on the optical axis of the lens, 2, on or near its focal plane. Curvature of the lens has a radius equal to or slightly higher than its focal length, F. The sensor, 1, is connected via conductors, 5, to the control circuit, 6, which, in turn, is connected for transmission of its output signal 8 to processing circuit, 7, whose output signal, 9, is the output of the detector.

The lens is divided into smaller portions (facets), 10, every one of which forms an individual focusing element. When the lens is positioned into the detector, optical axes of all facets should be directed to the place where the sensor, 1, is positioned. The lens is preferably of Fresnel type and its overall un-curved view is depicted in FIG. 6. Number of facets depends on the total angle of view, optimal detecting distance and expected size of an object. For detecting of humans, one facet per 10° of the view angle is a reasonable choice. If the narrower angle of view is required, the lens can be used in a flat, non-curved form.

The sensor, 1, is one of the well know temperature sensitive resistive type (thermistor, RTD, etc.) having either negative or positive temperature coefficient. It can be fabricated in any desirable shape, some of which are represented in FIGS. 2, 3, 4 and 5. The thermistor sensor usually contains two conductors, 5, sintered into ceramic body, 11, as shown in FIG. 2 for the droplet shape and in FIG. 3 for the cylindrical shape of the sensor. Another way to make the sensor is to wind a spiral from temperature sensitive resistive material, like wire, 12, as shown in FIG. 4. And an another way to fabricate the sensor is by using thick film technology, when the resistive material, 13, is printed on the substrate, 14 (FIG. 5). The choice of the sensor depends on the actual design of the optical system.

The detector operates as follows. After power-up, the control circuit, 6, supplies the sensor, 1, with electric current through the connecting conductors, 5. Current causes heating effect in the sensor whose temperature rises above ambient. If the sensor has a negative temperature coefficient, its resistance drops. This causes the control circuit, 6, to change current in such a way as to force the sensor's resistance to be equal to some predetermined value, $R_s$. Since there is an unambiguous relationship between the resistance of the sensor and its temperature, the constant resistance, $R_s$, corresponds to the constant temperature, $T_s$, of the sensor. Since $T_s$ is always higher than ambient temperature, the sensor starts to radiate thermal flux, 4, through the lens, 2, toward the object, 3. Intensity of the flux is governed by Equation (1). To improve emissivity of the sensor, its surface may be coated with paint (for instance, lampblack) having high degree of emissivity in far infrared range. That portion of the sensor, which is not exposed to the optical system, preferably should have lower emissivity. This can be achieved by metallizing an appropriate portion of the sensor with nickel, aluminum, gold or any other metal having low emissivity.

Since the sensor, 1, is positioned on the optical axis of each facet, 10, movement of the object, 3, in the normal direction to the axis, results in shifting of thermal emission from sensor, 1, to an empty volume of space near the object. The sensor becomes exposed to a thermally variable target: being either the object, or the surroundings. This results in modulation of thermal flux, 4, radiated from the sensor, 1, to the object, 3. That flux is the radiation heat loss from the sensor. The control circuit, 6, provides electric power to the sensor, 1, to compensate for the radiation heat loss. Because the radiation heat loss is modulated by movement of object 3, power is also modulated as a result of the object, 3, movements. Modulated power is represented by varying voltage, 8, at the output of the control circuit, 6. Voltage, 8, is amplified, filtered and processed in the circuit, 7, which is of a conventional design and is not described here in details. The circuit, 7, contains a bandpass filter with cutoff frequencies in the range of 0.3 to 3 Hz, and single or dual threshold window comparators to indicate when the signal change exceeds some preset value. The result of the signal processing is represented by the output voltage, 9.

Figure 16:
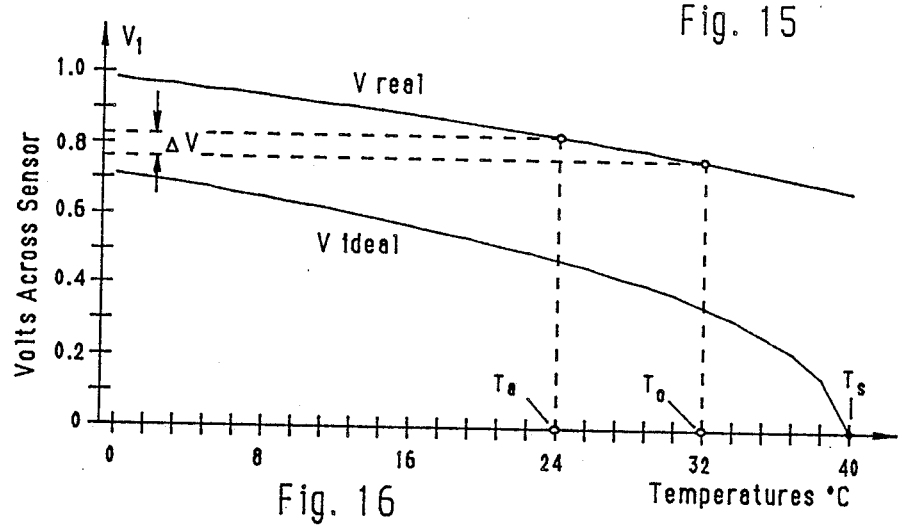
FIG. 16 represents voltage across sensor as function of object's temperature.

Voltage, $V_1$, across the sensor, 1, is represented in FIG. 16 as a function of object's, 3, temperature. The graph of FIG. 16 has two lines, one of them, $V_{ideal}$, represents an ideal sensor, when thermal loss is attributed only to radiation. $V_{real}$ represents voltage which is developed when the sensor has additional heat loss through air convection inside the detector and thermal conduction through supporting conductors, 5. The voltages in FIG. 16 were calculated for the following conditions: sensor's area, A=16 sq. mm., $T_s=40°$ C., $R_s=400$ Ω. When object, 3, moves, temperature of the target exposed to the sensor, 1, alternates between ambient, $T_a$, and object, $T_o$. As it follows from FIG. 16, the resulting voltage, $V_1$, varies for about $\Delta V=100$ mV when the object moves.

To improve spatial resolution, the sensor may be supplied with the additional component, called image distortion means. Its function is to break radiated flux into spatially separated segments. Such image distortion means can be fabricated in a form of a grid, 17, surrounding the sensor, 1 (FIG. 7). The grid forms openings, 18, through which flux can pass from the sensor, 1, and opaque portions, 19, which prevent flux from passing to the object. That side of the image distortion means which faces the sensor, preferably should be treated to increase its reflectivity. Such treatment may be vacuum metallizing with gold, aluminum or other metals.

FIG. 8 helps to clarify the function of the grid. When object, 22, is positioned in the location, 21, thermal flux, 24, emitted by the sensor, 1, passes through opening, 18, in the grid, 17, and after passing though lens, 20, reaches the object, 22. This radiation corresponds to voltage, $V_1$, which is related to object's temperature, $T_s$ (see FIG. 16). When the object, 22, moves into location, 23, flux, 25, from the sensor, 1, can not reach the object, because of the opaque portion, 19, of the grid, 17. Under that condition, the sensor's voltage will correspond to ambient temperature, $T_a$. The alternate voltage $\Delta V$ is a result of flux modulation by the grid, 17.

Figure 15:
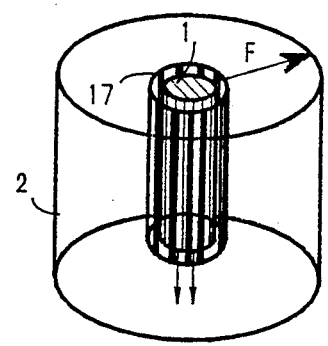
FIG. 15 is a schematic view of the combination of a sectional lens and a grid.

The image distortion means can be fabricated in a variety of shapes, for instance, grid (FIG. 10), checkerboard (FIG. 11) and many others. Since image distortion means improves spatial resolution, the lens, 2, of the focusing system can be made with smaller number of facets, depending on the required field of view. FIG. 12 depicts lens with only three sections, which is suitable for angles of view up to 180°, and FIG. 15 illustrates location of image distortion means, 17, with respect to the sensor, 1, and lens, 2, in the detector with circular field of view, which may require 6–10 sections in the lens.

Figure 20:
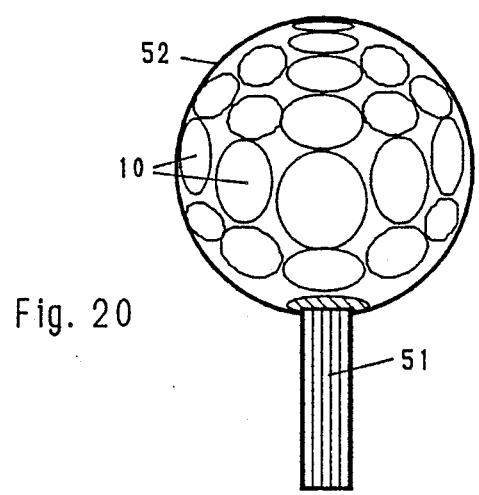
FIG. 20 illustrates ball-shaped optical system with facet lens.

If required, the field of view of the active detector can be made very wide: up to 360° of solid angle. The focusing system, containing facet lens, can be fabricated in a spherical form (FIG. 20). In other words, facets, 10, should shape the ball surface, 52, with radius of curvature equal to the focal length of each facet. The sensor must be positioned on or near the center. An entire detector is supported by the pole, 51.

Another method to direct thermal flux to the object, is to use a reflective means, which is illustrated in FIG. 9. Concave body, 15, has the inner reflective surface, 16, oriented toward the field of view. The sensor, 1, is positioned along the optical axis. In addition, it may be supplied with the image distortion means, 17. Such design yields narrower than lens angle of view. The concave reflector can be of many shapes: parabolic, spherical, cylindrical, etc. FIG. 13 depicts combination detector, 30, containing both the lens, 28, and the cylindrical reflector, 29. Image distortion means, 17, is facing lens, 28. All of them, including the lens, reflector and the image distortion means are curved around the same axis, where sensor, 1, is positioned. Reflector, 29, improves efficiency of the sensor by returning to it thermal flux radiated toward inner side of the detector, 30, which contains electronic module, 31.

Figure 18:
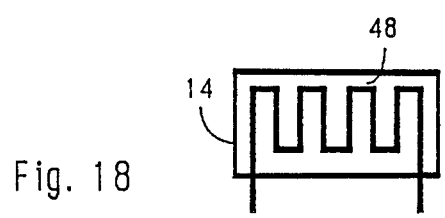
FIG. 18 shows thermo-resistive pattern printed on substrate.

An alternative way to break the radiated pattern, is to fabricate the sensor in a non-uniform shape, like those shown in FIG. 4 and FIG. 18. In the later case, the thermistor material, 48, is printed on the substrate, 14, in a snake-like pattern, forming waving continuous thermo-resistive strip. Naturally, the non-printed areas will radiate less energy than thermoresist, 48, resulting in effect, which is similar to that of image distortion means.

The control circuit, 6, is an important part of the motion detector. It can be designed in many different versions. As an illustration, the simplest circuit is shown in FIG. 14. It contains an operational amplifier, 33, and a self-balancing resistive bridge with fixed reference resistors, 34, 35 and 36. Sensor, 1, is also connected into the bridge. Output signals from the bridge, 38 and 37, pass to the positive and negative inputs of the amplifier, 33. Output voltage, 8, is applied to the bridge. The bridge can be in balance only if ratio of the resistors 34 and 36 is equal to ratio of the resistors, 35 and 1. Since all resistors, except, 1, are temperature independent, the resistance of the resistor, 1, is forced by the control voltage, 8, and current to remain at the constant level which is equal to the pre-selected value $R_s$, corresponding to the balanced state of the bridge.

To optimize detector's performance and reduce power consumption, it is reasonable to maintain temperature of the sensor at the level somewhat higher than ambient, but not too high. Preferably, that level should be lower at lower temperatures. The control circuit may include an ambient temperature sensor, whose function is to change the set point, as a function of ambient temperature. For instance, such ambient temperature sensor may be a thermistor, RTD or like, mounted on a heat sink, replacing one of the fixed resistors in the bridge shown in FIG. 14.

Lighting fixtures, sun, ventilation air ducts, fans, heaters and other sources of thermal radiation may cause spurious signals in the detector, resulting in false operation. Besides, variations in conductive and convective heat losses inside the detector may cause false detections. The powerful means to reduce such interferences is to use common mode rejection of signals detected from different directions. This demands a use of at least two separate sensors.

Figure 17:
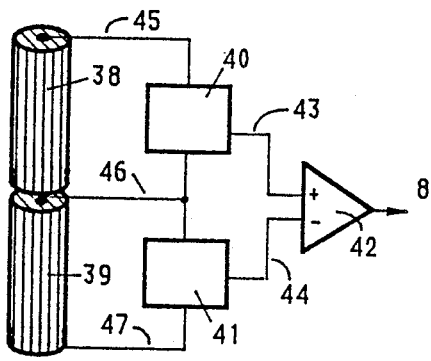
FIG. 17 depict dual sensor arrangement with difference amplifier.

FIG. 17 represents arrangement of the sensor which is separated into two equal sections, 38 and 39, forming two thermo-sensitive resistors. Each of them is connected to the corresponding control circuits, 40 and 41 via wires 45, 46 and 47. Outputs of both control circuits, 43 and 44 are fed into the inputs of the difference amplifier, 42, whose function is to subtract signal, 44, from signal, 43. The output signal, 8, is close to zero, if both sections, 38 and 39, detect identical thermal radiation changes, which are most likely resulted from the common source of interference, but not from moving objects. To minimize conduction and convection heat loss inside the detector, all sensor sections (temperature sensitive resistors) should be maintained by the control circuits at approximately the same temperature.

Figure 19:
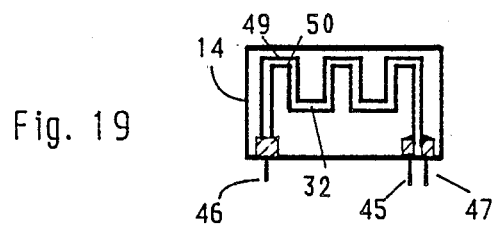
FIG. 19 shows dual thermo-resistive pattern printed on substrate.

Another way to fabricate two separate sections of the sensor is to print thermoresist patterns on the substrate, as it is shown in FIG. 19. Two snake-like strips, 49 and 50, are printed on the substrate, 14, separated by the gap, 32, and connected to the corresponding wires, 45 and 47, with common wire 46. Image distortion means is not required with that sensor, because such alternating pattern acts in the similar way.

What I claim is:

1. An active infrared radiation motion detector for detecting a moving object, said detector comprising:
   a support body;
   a first temperature sensitive self-heating resistive means capable of emitting thermal radiation in response to electric power through said resistive means, mounted on said support body for emitting said thermal radiation for radiating on a region which may include said object;
   a first electronic control circuit connected to said resistive means for maintaining the resistance of said resistive means at a predetermined value by adjusting electrical power through said resistive means, and for providing a signal indicative of change in said power, said change being indicative of modulation by movement of said object.

2. An active infrared radiation motion detector as described in claim 1, further comprising:
   means for focusing, located on said support body for focusing thermal radiation from said resistive means toward the region which may include said object.

3. An active infrared radiation motion detector as described in claim 2, further comprising:
   said means for focusing, comprising a plurality of individually focused lenses, arranged so that thermal radiation falling on said object in said region, from said lenses, changes as the object moves.

4. An active infrared radiation motion detector as described in claim 2, further comprising:
   said means for focusing comprising a reflector, having a high degree of reflectivity in the far infrared.

5. An active infrared radiation motion detector as described in claim 3, further comprising:
   said means for focusing comprising a Fresnel lens comprising a plurality of sections, where each section is capable of independent focusing of infrared radiation.

6. An active infrared radiation motion detector as described in claim 5, further comprising:
said Fresnel lens being curved to distribute infrared radiation produced by said resistive means over a desired field of view.

7. An active infrared radiation motion detector as described in claim 3, further comprising:
said resistive means being positioned within the focal plane of said means for focusing.

8. An active infrared radiation motion detector as described in claim 4, further comprising:
said resistive means being positioned within the focal plane of said reflector.

9. An active infrared radiation motion detector as described in claim 1, further comprising:
said temperature sensitive self-heating resistive means being a thermistor.

10. An active infrared radiation motion detector as described in claim 1, further comprising:
image distortion means, located on said support body between said resistive means and said region, for passing spatially selective levels of said emitted thermal radiation.

11. An active infrared radiation motion detector as described in claim 10, further comprising:
said image distortion means comprising a mask including a section having high attenuation for thermal radiation, and a section having low attenuation for thermal radiation passing through said mask.

12. An active infrared radiation motion detector as described in claim 2, further comprising:
material having a low degree of emissivity in far infrared located over portions of said resistive means which are outside of the thermal radiation gathering area of the focusing means.

13. An active infrared radiation motion detector as described in claim 1, further comprising:
a second temperature sensitive self-heating resistive means, and a second control circuit for maintaining said second resistive means at approximately equal temperature with said first self-heating resistive means by adjusting electrical power through said resistive means, and for providing a signal indicative of change in said power.

14. An active infrared radiation motion detector as described in claim 1, further comprising:
said control circuit maintaining the temperature of said resistive means at a level above ambient temperature of said region.

15. An active infrared radiation motion detector as described in claim 14, further comprising:
said control circuit maintaining the temperature of said resistive means at a level above the expected highest temperature of the moving object.

16. An active infrared radiation motion detector as described in claim 10, further comprising:
said resistive means comprising a non uniform pattern for delivering spatially selective levels of said emitted thermal radiation.

17. A method of active infrared radiation motion detection, for sensing a moving object whose temperature is different from that of ambient, said method comprising:
pre-heating an electrically heated, thermal radiation emitting, sensing means to a temperature above ambient;
maintaining the temperature of said sensing means at a constant level;
measuring the power required to maintain the temperature of said sensing means at constant level;
detecting variations exceeding a predetermined minimum in said power, said variations being indicative of movement of said object.

18. A method of active infrared radiation motion detection, as described in claim 17, further comprising:
directing thermal radiation from said sensor to surroundings by a focusing system.

19. A method of active infrared radiation motion detection, as described in claim 17, further comprising:
said preheating of sensing means being preheating of a pair of temperature sensitive self-heating resistors to approximately equal temperatures, at a temperature above ambient; and
said detecting-variations in said power, comprising comparing measured power required to maintain the temperature of each of said pair at a constant level, and
detecting variations between the measured power for each of said pair, said variations being indicative of movement of said object, exclusive of common sources of ambient thermal interference.

20. A method of active infrared radiation motion detection, as defined in claim 17 comprising use of focusing system to direct thermal radiation from said sensor to surroundings.

21. A method of active infrared radiation motion detection, as defined in claim 17 comprising use of at least two said sensing means.

* * * * *